United States Patent [19]

Giannini et al.

[11] 4,187,196

[45] Feb. 5, 1980

[54] PROCESS FOR THE STEREOREGULAR POLYMERIZATION OF ALPHA-OLEFINS

[75] Inventors: Umberto Giannini; Antonio Cassata; Paolo Longi, all of Milan; Romano Mazzocchi, Pernate, all of Italy

[73] Assignee: Montedison S.p.A., Milan, Italy

[21] Appl. No.: 955,762

[22] Filed: Oct. 30, 1978

Related U.S. Application Data

[63] Continuation of Ser. No. 795,363, May 9, 1977, abandoned, which is a continuation-in-part of Ser. No. 503,766, Sep. 6, 1974, abandoned, which is a continuation of Ser. No. 265,455, Jun. 23, 1972, abandoned.

[30] Foreign Application Priority Data

Jun. 25, 1971 [IT] Italy .................................. 26275 A/71

[51] Int. Cl.² ........................... C08F 4/02; C08F 10/06
[52] U.S. Cl. ............................. 252/429 B; 252/429 C; 526/114; 526/125; 526/351; 526/906
[58] Field of Search ..................... 252/429 B, 429 C

[56] References Cited

U.S. PATENT DOCUMENTS

| | | | |
|---|---|---|---|
| 3,238,146 | 3/1966 | Hewett et al. | 252/429 C |
| 3,642,746 | 2/1972 | Kashiwa et al. | 252/429 B |
| 3,718,636 | 2/1973 | Stevens et al. | 252/429 C |

FOREIGN PATENT DOCUMENTS 2029992 12/1970 Fed. Rep. of Germany.

*Primary Examiner*—Edward J. Smith

[57] ABSTRACT

There is disclosed a process for the stereoregular polymerization of alpha-olefins or mixtures thereof with ethylene, conducted in the presence of highly active and stereospecific new catalysts. The catalysts are obtained from the reaction of a particular Al-alkyl compound which is at least in part in the form of a complex and/or a substitution reaction product with an ester of an oxygenated organic or inorganic acid, with a supported component characterized by having surface area exceeding certain values or showing a particular X-rays spectrum, and obtained by contacting a Ti halogenated compound, preferably in the form of a complex with an electron-donor compound, with a support comprising a Mg or Mn bihalide in an activated condition.

In the catalysts the ratio between the Ti compound, expressed in Ti g-atoms, and the g moles of the ester and the electron-doner compound, when present, is lower than 0.3.

9 Claims, No Drawings

PROCESS FOR THE STEREOREGULAR POLYMERIZATION OF ALPHA-OLEFINS

This is a continuation of application Ser. No. 795,363 filed May 9, 1977, now abandoned, which in turn is a continuation-in-part of Ser. No. 503,766 filed Sept. 6, 1974 (now abandoned) in turn a continuation of Ser. No. 265,455 filed June 23, 1972 (now abandoned).

THE PRIOR ART

Highly active supported catalysts suitable for the olefin polymerization and obtained from metallorganic compounds of the metals of the I, II and III Group of the Periodic System and Ti compounds supported on Mg or Mn dihalides present in an active form have been disclosed for instance in Belgian Pat. Nos. 742,003, 742,112 and 754,152.

These catalysts are highly active in the polymerization of ethylene. When the catalysts are used for polymerizing alpha olefins, in particular propylene, they produce predominantly amorphous atactic polymers.

It is known that the activity and/or stereospecificity of Ziegler and Ziegler-Natta catalysts can be modified by adding to the catalysts certain Lewis bases. Generally the Lewis bases are used in the form of complexes with the Ti compound. However, catalysts are known in which the base can be used in an amount as high as to reach a 1:1 molar ratio with the Al compound.

When the polymerization of propylene is carried out with supported catalysts of the type described in the above mentioned Belgian patents, wherein the Ti compound is used in the form of a complex with a Lewis base, the stereospecificity of the catalyst is increased but the amount of the amorphous polymer is still too high. The thus modified supported catalysts do not find in practice any application in the polymerization of alpha-olefins.

In the Ziegler and Ziegler-Natta catalysts the molar ratio Al:Ti generally is not higher than 5–10:1. The preferred values range from 3:1 to 1:1.

When the ratios become as high as the ratios used in the supported catalysts wherein the amount of the Ti compound is very small in comparison with the Al-alkyl compound, the addition to the catalysts of a Lewis base has the effect of drastically lowering the activity of the catalysts.

From the above outlined behavior of the Ziegler and Ziegler-Natta catalysts modified with Lewis bases one would have expected that the sole way for obtaining supported catalysts still active and endowed with a certain stereospecificity was to use the Ti compounds in the form of a complex with a Lewis base.

THE PRESENT INVENTION

One object of this invention is to provide a process for the production with high yield of prevailingly isotactic polymers of alpha-olefins $CH_2=CHR$, wherein R is an alkyl radical containing from 1 to 6 carbon atoms.

A particular object of the invention is to provide a process for the production with high yield of prevailingly isotactic polymers of propylene.

A further object is to provide a process for the production of prevailingly isotactic polymers of propylene having satisfactory impact resistance at low temperatures and containing 1–20% by weight of polymerized ethylene.

These and other objects are accomplished by the present invention in accordance with which the polymerization of the alpha-olefins and mixtures thereof with minor proportions of ethylene is conducted in the presence of the new catalysts disclosed infra.

As peculiar characteristic these new catalysts associate very high activity with a remarkable stereospecificity. Owing to this characteristic and in particular to the fact that the activity of the catalysts is not remarkably reduced by the presence of hydrogen as molecular weight regulator during the polymerization process, the new catalysts permit to avoid or at least to considerably simplify the onerous treatments hitherto necessary for purifying the polymers from the catalyst residues.

The catalysts used in the process of this invention are the product of the reaction between:

(a) the addition and/or substitution reaction product of an electron donor compound (or Lewis base) selected from the group of the esters of the oxygenated organic and inorganic acids with an Al-trialkyl compound or with an Al-alkyl compound containing two or more Al atoms linked together through an oxygen or a nitrogen atom, the reaction product (a) being characterized in that the Al-organic compound present in combined form with the ester is comprised within the range from 0.05 to 1 mole per mole of the starting Al-compound.

(b) the product formed from the contact of a halogenated compound of bi, tri or tetravalent Ti, preferably in the form of an addition compound with an electron-donor compound, with a support formed of or comprising an anhydrous bihalide of Mg or Mn, the support and the component (b) being characterized in that they have surface area exceeding 3 $m^2/g$ or the component (b) being characterized in that in its X-rays powder spectrum the most intense diffraction lines characteristic of the X-rays powder spectrum of the normal, non activated Mg and Mn bihalides, are broadened and the component (b) being further characterized in that the amount of the Ti-compound therein present, expressed as Ti metal, is less than 0.3 g atom per mole of the total amount of the electron-donor compound present in a combined form in the catalyst.

By the expression "addition or substitution reaction product" of the electron-donor compound indicated sub (a) with the Al-alkyl compound is intended the product formed of or comprising a complex of the electron-donor compound with the Al-alkyl compound.

Any electron-donor compound of the class of the esters of the oxygenated organic and inorganic acids is suitable to prepare the component (a) of the catalysts.

Examples of esters which can be used are: esters of aliphatic, cycloaliphatic and aromatic mono and polycarboxylic acids; esters of alkoxy or amino acids; esters of inorganic acids like carbonic, phosphorous, sulphuric, phosphoric and silicic acids.

Examples of specific compounds are: ethylbenzoate, methylbenzoate, ethyl-p-methoxybenzoate, ethyl-p-butylbenzoate, ethyl-p-chlorobenzoate, ethyl-p-butoxybenzoate, isobutylbenzoate, ethyl-p-methylbenzoate, ethylacetate, ethyl propionate, ethyl-alpha-haphthoate, ethylcyclohexanoate, ethyl pivalate, ethyl N,N-diethylcarbamate, diethyl carbonate, diethylsulphate, dimethylmaleate, ethyl-benzensulfonate.

The most interesting results both with respect to activity and stereospecificity of the catalyst, are obtained with the esters of the aromatic acids like: ethylbenzoate, ethyl-p-methoxybenzoate; ethyl alpha naphthoate. The preferred molar ratio ester/Al organic compound in component (a) is lower than 1; in general it ranges from 0.3 to 0.5.

The following Al-trialkyl compounds are particularly suited for preparing component (a): $Al(C_2H_5)_3$; $Al(CH_3)_3$; $Al(nC_3H_7)_3$ and $Al(iC_4H_9)_3$.

Examples of other Al-trialkyls are:

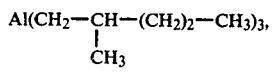

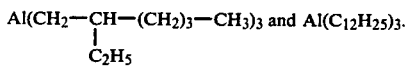

The metallorganic compounds which contain two or more Al atoms linked through an O or N atom are obtained by reaction of an Al-trialkyl compound with water, ammonia or a primary amine, according to known methods.

Examples of such compounds are:

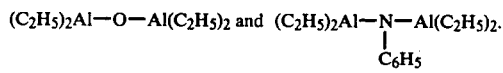

The component (a) of the catalyst can be obtained by several methods. The preferred method consists in prereacting the ester with the Al-organic compound in the adequate molar ratio before contact thereof with component (b).

The starting molar ratio ester/Al-organic compound varies in general from 0.05 to 1.

Another adequate method for preparing component (a), which at the same time permits to obtain the Mg and Mn halide in an active form suitable for preparing the catalysts according to this invention, consists in reacting an addition compound between the Mg or Mn halide and an ester of an oxygenated organic or inorganic acid with an Al-trialkyl employed in such a quantity that the Al-trialkyl/ester molar ratio is higher than 1.

According to another method, component (a) is formed in situ by reacting the Al-trialkyl compound with the component (b) and then adding the ester in the quantity suitable for forming component (a).

The electron donor compounds which can be employed in preparing component (b) can be the same esters as those used in preparing component (a) or can be different. Also, in this case any electron-donor compound capable of giving complexes with the halogenated Ti compound is suitable for preparing component (b).

Examples of electron-donor compounds are: N,N,N',N'-tetramethylethylendiaminol veratrol, ethyl benzoate, acetone, 2,5-hexanedione, dimethylmaleate, dimethylmalonate, tetrahydrofurfurylmethylether, nitrobenzene, diethyl carbonate, acetophenone, 1,2,4-trimethyl piperazine, ethyl acetate.

The diamines and the esters of oxygenated organic and inorganic acids are particularly suitable both with respect to the activity and stereospecificity of the catalyst.

The Ti compounds which can be employed include any halogenated compound of bi, tri and tetravlent Ti. Examples of such compounds are: $TiCl_4$, $TiCl_3$, $TiI_4$, $Ti(OC_3H_7)Cl_3$, $Ti(OC_4H_9)_2Cl_2$, $3TiCl_3.AlCl_3$, $Ti[O—C(CH_3)=CH—CO—CH_3]_2Cl_2$, $Ti[N(C_2H_5)_2]Cl_3$, $Ti[N(C_6H_5)_2]Cl_3$, $Ti(C_6H_5COO)Cl_3$, 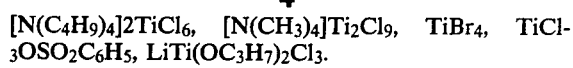, $[N(CH_3)_4]Ti_2Cl_9$, $TiBr_4$, $TiCl_3OSO_2C_6H_5$, $LiTi(OC_3H_7)_2Cl_3$.

The catalyst component (b) may also be prepared according to various methods. One method consists in contacting the Mg or Mn halide, which can be present in a preactivated form, with the Ti compound previously complexed with the base and carrying out the contact under conditions at which the resulting product has a surface area higher than 3 m$^2$/g and/or its X-rays spectrum shows a broadening of the most intense diffraction lines characteristic of the normal non-activated Mg and Mn bihalides. This can be obtained, e.g., by dry milling the support in the presence of the Ti compound.

Good results are also obtained by simply mixing the Ti compound with preactivated Mg or Mn bihalides having surface area exceeding 3 m$^2$/g.

Another method, according to which the complex of the Ti compound with an ester is formed in situ, consists in adding the ester suitable to form component (a) either before or after the addition of the Al-alkyl to the previously supported Ti compound.

Examples of useful Ti addition compounds are: $TiCl_4.C_6H_5COOC_2H_5$; $TiCl_4.2C_6H_5COOC_2H_5$; $TiCl_4.pCH_3OC_6H_4COOC_2H_5$; $TiCl_4.C_6H_5NO_2$; $TiCl_3.(CH_3)_2N(CH_2)_2N(CH_3)_2$; $TiCl_4.(CH_3)_2N(CH_2)_2N(CH_3)_2$; $TiCl_4.CH_3COC_2H_5$; $TiCl_4.2C_4H_8O$; $TiCl_3.C_6H_5COOC_2H_5$.

The quantity of Ti compound present on the support is generally comprised between 0.1 and 10% by weight expressed as Ti metal. The quantity of Ti compound present in the catalyst expressed as Ti metal is less than 0.3 g-atom per mole of the total amount of electron donor-compound present in combined form in the catalyst; preferably said quantity is less than 0.1 g-atoms and more particularly it is comprised between 0.05 and 0.005 g-atoms. The Al/Ti molar ratio is generally comprised between 10 and 1000.

The expression Mg and Mn bihalide in active form as used herein refers to Mg and Mn bihalides having surface area exceeding 3 m$^2$/g and/or said bihalides the X-rays powder spectrum of which shows a broadening of the most intense diffraction lines characteristic of the normal non-activated Mg and Mn bihalides.

The Mg and Mn bihalides in the active form may be prepared according to various methods.

In the particular embodiment of our invention with which this application is concerned, normal anhydrous Mg or Mn bihalide is converted to the active form by reacting it with an electron-donor which is an ester of an oxygenated organic or inorganic acid followed by decomposition of the resulting reaction product or complex by treatment thereof with a trialkyl used in an amount such that the Al trialkyl ester molar ratio is higher than 1.

Anhydrous compounds of elements of the Ist, IInd, IIrd and IVth group of the periodic system different from the Mg and Mn bihalides may be added to the activated Mg or Mn halides without substantially reducing the activity of the catalyst obtainable therefrom, but with the advantage of diminishing or even annulling the negative effects of the high chloride contents in the polymer.

In order to avoid any substantial alteration in the catalyst activity, the anhydrous compounds of the Ist, IInd, IIIrd and IVth group different from the Mg and Mn bihalides must not substantially interact with the Mg or Mn halides.

Typical examples of the compounds of Group I to IV metals useful as diluents of the activated Mg or Mn bihalide support are: LiCl, CaCO$_3$, CaCl$_2$, SrCl$_2$, BaCl$_2$, Na$_2$SO$_4$, Na$_2$CO$_3$, TiO$_2$, Na$_2$B$_4$O$_7$, Ca$_3$(PO$_4$)$_2$, CaSO$_4$, BaCO$_3$, Al$_2$(SO$_4$)$_3$, B$_2$O$_3$, SiO$_2$, etc.

The quantity of these substances which can be incorporated with the Mg and Mn anhydrous halide, without substantially altering the activity of the catalyst obtained therefrom, may vary in a broad interval which may, e.g., range from 30 to 70% by weight. As already indicated, the surface area of the support consisting of or comprising the activated anhydrous bihalide of Mg and Mn is larger than 3 m$^2$/g. Good results have been obtained with surface areas ranging from 20 to 30 m$^2$/g.

It has been found, and this constitutes another aspect of the process of this invention, that the polymerization of propylene can be carried out in liquid phase in the substantial absence of inert diluents without appreciably reducing the isotacticity index of the obtained polymer. This result is unexpected and surprising since operating with catalysts supported of MgCl$_2$ in which only the Ti compound is used in form of a complex the stereospecificity of the catalyst is remarkably reduced when the polymerization is conducted in liquid propylene.

The use of liquid propylene permits on the other hand with respect to the process carried out in presence of an inert diluent to considerably increase the polymerization rate, with a resulting higher hourly output of the polymerization reactors.

The conditions under which the polymerization of the alpha-olefins with the aid of these new catalysts is conducted are those known in the art. Thus, the polymerization is carried out at temperatures ranging from −80° C. to 150° C., preferably from 40° C. to 100° C., operating with partial pressures of the alpha-olefins higher than the atmospheric pressure. The polymerization can be carried out both in liquid phase in the presence of, or in the absence of, an inert liquid diluent, or in the gas phase.

The alpha-olefins comprise, in general, olefins CH$_2$=CHR in which R is an alkyl radical containing 1-6 C. Propylene, butene-1, 4-methylpentene-1 are examples of alpha-olefins. As hereinbefore indicated the process can be used to polymerize mixtures of alpha-olefins with minor proportions of ethylene.

Examples of inert diluents which can be used in the polymerization are the C$_4$-C$_8$ aliphatic hydrocarbons typical of which are n-hexane, n-heptane, the cycloaliphatic hydrocarbons like cyclohexane and the aromatic hydrocarbons such as benzene, toluene, xylene.

The production of prevailingly isotactic polypropylene having satisfactory impact resistance at low temperatures and containing from 1 to 20% by weight of polymerized ethylene is also carried out under conventional conditions, in accordance with which propylene is either polymerized in the presence of small amounts of ethylene fed continuously or intermittently into the reactor or ethylene is polymerized after at least 80% of the propylene is converted to polypropylene.

The regulation of the molecular weight of the polymer during the polymerization is also carried out according to known methods, operating, e.g., in the presence of alkyl halides, Zn or Cd organo-metallic compounds, or hydrogen. As already mentioned the presence of hydrogen as molecular weight regulator in the process according to this invention does not appreciably reduce the activity and/or stereospecificity of the catalysts.

The invention is described in more detail in the following examples which are given only as illustrative and not intended to be limiting. Unless otherwise specified, the percentages mentioned in the examples are expressed by weight; the inherent viscosity of the polymer $\eta_{in}$ was measured in tetralin at 135° C., using concentrations of 0.25 g polymer in 100 cm$_3$ solvent.

EXAMPLE 1

11.777 g anhydrous MgCl$_2$ and 0.7924 g of the complex TiCl$_4$. (CH$_3$)$_2$N—CH$_2$CH$_2$—N(CH$_3$)$_2$ are milled in a nitrogen atmosphere for 16 hours in a glass mill (length 100 mm, diameter 50 mm) containing 550 g steel balls having a diameter of 9.5 mm. The surface area of the milled product was 8 m$^2$/g. 0.7697 g of the thus milled mixture (having a Ti content of 0.993 by weight) are suspended in the solution (previously prepared at room temperature and maintained at this temperature for 10′) of 0.82 g Al(C$_2$H$_5$)$_3$ and 0.316 g ethyl benzoate in 50 cm$^3$ anhydrous and deareated n-heptane, and the thus obtained suspension is injected under pressure of dry argon, into a stainless steel autoclave having a 3 l capacity, provided with magnetic stirring, heated to the temperature of 65° and containing 900 g anhydrous propylene. Stirring is discontinued after 6 hours, the unpolymerized propylene is discharged and a white, pulverulent product is removed from the autoclave which, after drying, amounts to 228 g corresponding to a yield of 30,000 g polymer per gram of titanium employed. The extraction with boiling n-heptane gave a residue of 93.5%.

The inherent viscosity of the crude polymer is=5.08 dl/g.

EXAMPLE 2

8.86 g anhydrous MgCl$_2$ and 0.699 g of the complex TiCl$_4$. C$_6$H$_5$COOC$_2$H$_5$ are milled under a nitrogen atmosphere for 16 hours in a glass mill, as described in example 1. The surface area of the milled product was 32 m$^2$/g. The X-rays spectrum of the product showed a broadening of the most intense diffraction lines characteristic of MgCl$_2$.

0.1507 g of the thus obtained mixture (having a Ti content of 1.03% by weight) are suspended in the solution (previously prepared at room temperature and maintained at this temperature for 5′) of 0.655 g Al(C$_2$H$_5$)$_3$ and 0.252 g ethyl benzoate in 50 cm$^3$ anhydrous n-heptane and the thus obtained suspension is injected under pressure of dry argon, into a stainless steel autoclave having a 2 l capacity provided with magnetic stirring, heated to a temperature of 65° C. and containing 500 g anhydrous propylene.

After 6 h, stirring is discontinued, the unpolymerized propylene is discharged and a white pulverulent product is removed from the autoclave which, after drying, amounts to 112 g, corresponding to a yield of 72,300 g polymer per g of Ti employed.

The extraction with boiling n-heptane gave a residue of 92.2%. The inherent viscosity of the crude polymer is=3.68 dl/g.

EXAMPLE 3

9.51 g anhydrous MgCl$_2$ and 0.74 g of the 1:1 molar complex between TiCl$_4$ and veratrol are milled in a nitrogen atmosphere for 16 hours in a glass mill as described in example 1.

Using 124.7 mg of the thus prepared mixture and polymerizing propylene under the conditions described in example 2, 70 g polypropylene are obtained which correspond to a yield of 53,000 g polymer per gram of titanium employed.

The extraction with boiling n-heptane gave a residue of 74%.

The inherent viscosity of the crude polymer is =4.42 dl/g.

EXAMPLE 4

10.1 g anhydrous $MgCl_2$ and 0.62 g of the 1:1 molar complex between $TiCl_4$ and tetrahydrofurfuryl methylether are milled under a nitrogen atmosphere for 16 hours in a glass mill as described in Example 1.

Using 196.5 mg of the thus prepared mixture and polymerizing propylene under the conditions described in Example 2 70 g polymer are obtained which correspond to a yield of 37,600 g polymer per gram of titanium employed. The extraction with boiling n-heptane gave a residue of 77.3%. The inherent viscosity of the crude polymer is 4.9 dl/g.

EXAMPLE 5

9.62 g anhydrous $MgCl_2$ and 0.65 g of the complex $TiCl_4.CH_3$—$CO$—$CH_2$—$CH_2$—$CO$—$CH_3$ are milled under a nitrogen atmosphere for 16 hours in a glass mill as described in Example 1.

Using 135.3 mg of the thus prepared mixture and polymerizing propylene under the conditions described in Example 2, 33 g polymer are obtained which correspond to a yield of 24,400 g/g Ti. The extraction with boiling n-heptane gave a residue of 84.7%. The inherent viscosity of the crude polymer was 3.82 dl/g.

EXAMPLE 6

9.33 g anhydrous $MgCl_2$ and 0.65 g of the complex $TiCl_4.2CH_3$—$CO$—$CH_3$ are milled under a nitrogen atmosphere in a glass mill as described in Example 1.

Using 169 mg of the thus prepared mixture and polymerizing propylene under the conditions described in Example 2, 88 g polymer are obtained which correspond to a yield of 51,000 g/g Ti. The extraction with boiling n-heptane gave a residue of 86.3%. The inherent viscosity of the crude polymer is =3.7 dl/g.

EXAMPLE 7

8.95 g anhydrous $MgCl_2$ and 0.67 g of the 1:1 in moles complex between $TiCl_4$ and dimethyl maleate are milled under a nitrogen atmosphere for 16 hours in a glass mill as described in Example 1, using 147.4 mg of the thus obtained mixture and polymerizing propylene under the conditions of Example 2, 34 g polymer are obtained which correspond to a yield of 23,000 g/g Ti.

The extraction with boiling n-heptane gave a residue of 85.2%. The inherent viscosity of the crude polymer is 4.18 dl/g.

EXAMPLE 8

9.59 g anhydrous $MgCl_2$ and 0.67 g of the 1:1 in moles complex between $TiCl_4$ and nitrobenzene are milled under a nitrogen atmosphere in a glass mill as described in Example 1.

Using 196.8 mg of the thus prepared mixture and polymerizing propylene under the conditions described in Example 2, 64 g polymer are obtained after 5 hours, which correspond to a yield of 32,500 g/g Ti.

The extraction with boiling n-heptane gave a residue of 85.4%. The inherent viscosity of the crude polymer is 3.72 dl/g.

EXAMPLE 9

10.66 g anhydrous $MgCl_2$ and 0.69 g of the 1:1 in moles complex between $TiCl_4$ and diethyl carbonate were milled under a nitrogen atmosphere, for 16 hours, in a glass mill as described in example 1. Using 164.6 mg of the thus prepared mixture, and polymerizing propylene under the conditions described in Example 2 after 5 hours, 222 g of polymer are obtained which correspond to a yield of 142,000 g/g Ti.

The extraction with boiling n-heptane gave a residue of 82.6%. The inherent viscosity of the crude polymer is 3.54 dl/g.

EXAMPLE 10

10.57 g anhydrous $MgCl_2$ and 0.45 g $TiCl_4$ are milled together under the conditions described in Example 1.

131.4 mg of the thus obtained mixture are suspended in 50 $cm^3$ n-heptane and in the thus obtained suspension there are added successively 0.655 g $Al(C_2H_5)_3$ and 0.252 g ethyl benzoate. After 5 minutes the thus prepared heptane suspension is injected under pressure of dry argon into a stainless steel autoclave having a 2 l capacity, heated to a temperature of 65° C. and containing 500 g anhydrous propylene. After 6 hours, stirring is discontinued and 80 g polymer are separated from the mixture, in the way described in Example 2, which correspond to a yield of 59,000 g/g Ti. The extraction with boiling n-heptane gave a residue of 82.1%. The inherent viscosity of the crude polymer is 3.72 dl/g.

EXAMPLE 11

Example 10 was repeated using 160.9 mg of the product obtained by milling together $MgCl_2$ and $TiCl_4$ and inverting the order of addition of aluminum triethyl and ethyl benzoate.

74 g of polymer are thus obtained, which correspond to a yield of 44,600 g/g Ti. The extraction with boiling n-heptane gave a residue of 83%.

The inherent viscosity of the crude polymer is 3.32 dl/g.

EXAMPLE 12

4.99 g anhydrous $MgBr_2$ and 0.40 g of the complex $TiCl_4.C_6H_5COOC_2H_5$ are milled together under the conditions described in Example 1.

Using 144 mg of the thus obtained mixture and polymerizing propylene under the conditions described in Example 2 after 5 hours polymerization 178 g polymer are obtained which correspond to a yield of 118,000 g/g Ti.

The extraction with boiling n-heptane gave a residue of 82%. The inherent viscosity of the crude polymer is 2.88 dl/g.

EXAMPLE 13

30 g anhydrous $MnCl_2$ are dissolved in 100 $cm^3$, anhydrous ethanol. A powder having a specific area of 22 $m^2/g$ is obtained by fast evaporation of the alcohol and subsequent drying at 300° C., under reduced pressure of 0.1 mm Hg.

7.96 g of the thus obtained product and 0.685 g of the complex $TiCl_4.C_6H_5COOC_2H_5$ are milled together for 40 hours, under the conditions described in Example 1.

Using 170.3 mg of the thus prepared product and polymerizing propylene under the conditions described in Example 2, after 5 hours polymerization, 64 g polymer are obtained which correspond to a yield of 33,500 g/g Ti. The extraction with boiling n-heptane gave a residue of 74.3%.

The inherent viscosity of the crude polymer is 2.5 dl/g.

EXAMPLE 14

8.47 g anhydrous $MgCl_2$ and 1.37 g ethyl benzoate are milled as described in Example 1 for 16 hours. After said period of time, 1.188 g of the complex $TiCl_4.2C_6H_5COOC_2H_5$ is introduced into the mill and is milled for another 16 hours.

The X-rays spectrum of the milled product shows a broadening of the most intense diffraction lines characteristic of the X-rays spectrum of $MgCl_2$.

0.4116 g of the thus obtained mixture (having a Ti content of 1.05% by weight) are suspended in the solution of 0.82 g $Al(C_2H_5)_3$ and 0.241 g $C_6H_5COOC_2H_5$ in 50 cm$^3$ anhydrous n-heptane. The thus obtained suspension is injected under pressure of dry argon into a stainless steel autoclave, having a 3 l capacity provided with magnetic stirring, heated to the temperature of 65° C. and containing 900 g anhydrous propylene.

After 5 hours polymerization, 315 g polymer are obtained which correspond to a yield of 73,000 g/g Ti.

The extraction with boiling n-heptane gave a residue of 85.5%. The inherent viscosity of the crude polymer is=3.7 dl/g.

EXAMPLE 15

4.2 g anhydrous $MgCl_2$, 3.23 g anhydrous $Na_2CO_3$ and 0.63 g of the complex $TiCl_4.C_6H_5COOC_2H_5$ are milled together under a nitrogen atmosphere, for 40 hours, under the conditions described in Example 1. The X-rays spectrum of the milled product shows a broadening of the most intense diffraction lines of $MgCl_2$.

Using 172.9 mg of the thus prepared mixture (having a Ti content of 1.1% by weight) and polymerizing propylene under the conditions described in Example 2 after 5 hours, 232 g polymer are obtained, which correspond to a yield of 122,000 g/g Ti.

The extraction with boiling n-heptane gave a residue of 87.4%. The inherent viscosity of the crude polymer is=3.86 dl/g.

EXAMPLE 16

8.75 g anhydrous $MgCl_2$ and 0.76 g of the 1:1 molar complex between $TiCl_4$ and dimethyl phthalate were milled together under a nitrogen atmosphere for 16 hours in a glass mill as described in Example 1. Using 155.8 mg of the thus prepared mixture and polymerizing propylene under the conditions described in Example 2 after 5 hours, 58 g polymer are obtained which correspond to a yield of 37,100 g/g Ti. The extraction with boiling n-heptane gave a residue of 87.5%. The inherent viscosity of the crude polymer is 3.5 dl/g.

EXAMPLE 17

9.35 g anhydrous $MgCl_2$ and 0.67 g of the complex $TiCl_4.CH_3COOC_2H_5$ were milled together as described in Example 1. Using 139.2 mg of the thus prepared mixture and polymerizing propylene under the conditions described in Example 2 after 5 hours reaction, 154 g polymer are obtained which correspond to a yield of 96,800 g/g Ti. The extraction with boiling n-heptane gave a residue of 85.5%.

The inherent viscosity of the crude polymer is 3.94 dl/g.

EXAMPLE 18

10.38 g anhydrous $MgCl_2$ and 0.75 g of the 1:1 molar complex between $TiCl_4$ and diethyl malonate are milled together as described in Example 1.

Using 0.5756 g of the thus obtained mixture and polymerizing propylene under the conditions described in Example 1, after 5 hours polymerization, 243 g polypropylene are obtained, which correspond to a yield of 47,500 g/g Ti. The residue of the extraction with boiling n-heptane amounts to 75%. The inherent viscosity of the crude polymer is=3.64 dl/g.

EXAMPLE 19

4.94 g anhydrous $MgCl_2$, 4.57 g anhydrous $CaSO_4$ and 0.92 g of the complex $TiCl_4.C_6H_5COOC_2H_5$ are milled together, in a nitrogen atmosphere for 40 hours under the conditions described in Example 1.

Using 127.3 mg of the thus prepared mixture (having a titanium content of 1.25% by weight) and polymerizing propylene under the conditions described in Example 2 after 5 hours reaction, 314 g polypropylene are obtained which correspond to a yield of 197,000 g/g Ti.

The extraction with boiling n-heptane gave a residue of 80%. The inherent viscosity of the crude polymer is=3.4 dl/g.

EXAMPLE 20

3.82 g anhydrous $MgCl_2$, 3.68 g anhydrous $CaCO_3$ and 0.80 g of the complex $TiCl_4.C_6H_5COOC_2H_5$ are milled together in a nitrogen atmosphere, for 40 hours under the conditions described in Example 1.

Using 166.9 mg of the thus prepared mixture (having a Ti content of 1.37% by weight), and polymerizing propylene under the conditions described in Example 2, after 5 hours polymerization, 244 g polypropylene are obtained, which correspond to a yield of 106,500 g/g Ti. The extraction with boiling n-heptane gave a residue of 83.8%.

EXAMPLE 21

2.90 g anhydrous $MgCl_2$, 4 g anhydrous $Na_2SO_4$ and 0.73 g of the complex $TiCl_4.C_6H_5COOC_2H_5$ are milled together, in a nitrogen atmosphere, for 40 hours under the conditions described in Example 1.

Using 137.2 mg of the thus prepared mixture (having a Ti content of 1.36% by weight) and polymerizing propylene under the conditions described in Example 2, after 5 hours polymerization, 76 g polymer are obtained which correspond to a yield of 40,800 g/g Ti.

The extraction with boiling n-heptane gave a residue of 78.8%.

EXAMPLE 22

9.52 g anhydrous $MgCl_2$ and 0.42 g $TiCl_3N(C_2H_5)_2$ are milled together in a nitrogen atmosphere for 64 hours, under the conditions described in Example 1.

0.366 g of the thus prepared mixture (having a Ti content of 0.89%), are suspended in the solution of 0.82 g $Al(C_2H_5)_3$ and 0.264 g ethyl benzoate in 50 cm$^3$ anhydrous and de-aerated n-heptane. The thus obtained suspension in injected under pressure of dry argon, into stainless steel autoclave having a 1 liter capacity heated to a temperature of 65° C. and containing 310 g anhydrous propylene. After 5 hours polymerization, 98 g polymer are obtained which correspond to a yield of 30,000 g/g Ti.

The extraction with boiling n-heptane gave a residue of 70.5%.

EXAMPLE 23

11.777 g anhydrous $MgCl_2$ and 0.7924 g of the complex $TiCl_4(CH_3)_2-N-CH_2-CH_2-N(CH_3)_2$ are milled together as described in Example 1.

0.2256 g of the thus obtained mixture (having a titanium content of 0.993% by weight) are suspended in the solution of 0.655 g $Al(C_2H_5)_3$ and 0.252 g $C_6H_5COOC_2H_5$ in 50 cm$^3$ anhydrous n-heptane. The thus obtained mixture is introduced into a glass flask having a 1 l. capacity, provided with a stirrer and containing 330 g 4 methyl-pentene-1. The whole is stirred and heated to a temperature of 54° for 8 hours.

The polymerization is then discontinued and 26 g polymer are separated, which correspond to a yield of 11,520 g/g Ti.

The extraction with boiling ethyl ether gave a residue of 80%. The inherent viscosity of the crude polymer is=4.85 dl/g.

EXAMPLE 24

The complex $MgCl_2.pCH_3OC_6H_4-COOC_2H_5$ is reacted at 40° C. for 20 hours with an excess of $Al(C_2H_5)_3$ dissolved in n-heptane; the insoluble product is filtered, suspended again in a solution of $Al(C_2H_5)_3$ filtered and accurately washed with n-heptane and dried. 1.0955 of the thus obtained product are suspended in 15 cm$^3$ toluene containing 0.1113 g of the complex $TiCl_4.C_6H_5COOC_2H_5$.

This mixture is maintained under agitation for 16 hours at room temperature; afterward the solvent is removed under vacuum.

0.450 g of the thus obtained product (containing 1.23% by weight of Ti) are employed for the preparation of the catalyst and polymerization of propylene according to Example 25 herebelow.

180 g polymer are obtained, which gave a residue to the extraction with boiling n-heptane=91.5%.

EXAMPLE 25

8.38 g of a mixture of 4.19 g anhydrous $MgCl_2$ and 4.19 g anhydrous $B_2O_3$ milled in a ball mill and 2.34 g of the molar complex $TiCl_4$.ethyl benzoate are milled together in a nitrogen atmosphere for 110 hours.

0.1164 g of the thus prepared mixture having a Ti-content of 3.08% by weight are suspended in a solution of 0.82 g Al-triethyl and 0.489 g p.methoxy ethyl benzoate in 50 cm$^3$ anhydrous and deareated n-heptane and the thus obtained suspension is injected under pressure of dry argon into a stainless steel autoclave having 3 l capacity, provided with magnetic stirring heated to 65° C. and containing 850 g anhydrous propylene and 2 l hydrogen measured at normal conditions.

After 5 hours of polymerization the unpolymerized propylene is separated and a white pulverulent product is obtained which after drying, amounts to 415 g, corresponding to a yield of 115,000 g polymer per gram of titanium. The extraction with boiling n-heptane gave a residue 89.5%. The inherent viscosity of the crude polymer is=2.09 dl/g.

EXAMPLES 26–55

In Table 1 are given the results of some examples of polymerization of propylene conducted under the conditions as described in Example 2 but replacing ethylbenzoate complexed with the Al-triethyl by ethyl-p-methoxy benzoate and replacing ethyl benzoate complexed with $TiCl_4$ by the electron-donor compounds indicated in Table 1.

The polymerization time was 5 hours.

TABLE 1

| Example No. | $MgCl_2$ g | Electron-donor compound used in 1:1 molar complexes with $TiCl_4$ g | Ti % weight (a) | supported cat. componant(b) g | P-methoxy bezoate/Al molar ratio | yield g polymer/g Ti | Residue in boiling n-heptane % | $\eta$ih dl/g |
|---|---|---|---|---|---|---|---|---|
| 26 | 11.06 | 0.826 ethyl benzoate | 0.995 | 0.1286 | 0.39 | 53100 | 91.2 | 4.54 |
| 27 | 10.65 | 0.81 methyl -otoluate | 1.01 | 0.1210 | 0.35 | 114500 | 89.7 | 4.22 |
| 28 | 8.54 | 0.89 t.butyl-p-anisate | 1.43 | 0.1309 | 0.39 | 46500 | 89.5 | 4.2 |
| 29 | 10.49 | 0.70 ethyl p-toluate | 0.88 | 0.1204 | 0.39 | 94400 | 90.8 | 4.68 |
| 30 | 5.96 | 0.55 coumarin | 1.20 | 0.1190 | 0.39 | 117000 | 88.0 | 3.62 |
| 31 | 9.83 | 0.68 ethyl p-anisate | 0.835 | 0.1214 | 0.40 | 127000 | 89.8 | 4.54 |
| 32 | 12.60 | 0.89 ethyl cinnamate | 0.86 | 0.1554 | 0.39 | 113500 | 88.6 | 4.10 |
| 33 | 14.93 | 0.42 ethyl NN diethylaminoacetate | 0.45 | 0.3443 | 0.39 | 58000 | 90.0 | 4.2 |
| 34 | 10.92 | 0.81 ethyl-2-furoate | 1.04 | 0.1417 | 0.39 | 102100 | 89.1 | 4.06 |
| 35 | 8.89 | 0.40 $\gamma$-butyrrolactone | 0.75 | 0.1330 | 0.39 | 50000 | 89.4 | 3.72 |
| 36 | 8.49 | 0.58 t-butyl pivalate | 1.06 | 0.1408 | 0.39 | 22100 | 90.0 | 4.48 |
| 37 | 9.30 | 0.66 ethyl pivalate | 1.02 | 0.1431 | 0.39 | 118500 | 89.8 | 4.32 |
| 38 | 11.45 | 0.84 $\epsilon$-caprolactam | 1.07 | 0.1540 | 0.39 | 44800 | 91.1 | 4.28 |
| 39 | 12.40 | 1.03 phthalide | 1.10 | 0.1118 | 0.39 | 56900 | 88.2 | 3.68 |
| 40 | 9.77 | 1.03 ethyl p-anisate (c) | 0.81 | 0.1233 | 0.39 | 181000 | 89.0 | 4.42 |
| 41 | 9.71 | 1.19 2-ethoxy-ethyl-p-anisate | 1.28 | 0.1110 | 0.39 | 40000 | 91.2 | 4.80 |
| 42 | 11.54 | 0.83 ethyl p-buthoxy benzoate | 0.805 | 0.2281 | 0.39 | 99500 | 89.5 | 4.52 |
| 43 | 9.98 | 0.88 ethyl 3.5-dimethylbenzoate | 1.08 | 0.1528 | 0.39 | 103000 | 89.8 | 4.53 |
| 44 | 10.59 | 0.79 ethyl p-isopropoxy benzoate | 0.88 | 0.1515 | 0.39 | 68500 | 88.6 | 4.26 |
| 45 | 9.16 | 0.73 ethyl p-t-butyl benzoate | 0.91 | 0.1285 | 0.39 | 119700 | 89.0 | 4.56 |
| 46 | 9.83 | 1.01 ethyl p-phenylbenzoate | 1.09 | 0.1510 | 0.39 | 66000 | 91.3 | 4.61 |
| 47 | 11.52 | 0.9 methyl p-anisate | 1.00 | 0.1690 | 0.39 | 59500 | 90.5 | 4.32 |
| 48 | 9.2 | 0.84 ethyl p-acetoxybenzoate | 0.93 | 0.1270 | 0.39 | 62700 | 89.2 | 4.11 |
| 49 | 8.50 | 0.74 triphenylphosphine | 0.975 | 0.1750 | 0.39 | 51600 | 89.8 | 4.53 |
| 50 | 11.48 | 0.85 N,N diethyl p-anisamide | 0.91 | 0.1289 | 0.39 | 35000 | 90.3 | 4.20 |
| 51 | 8.90 | 0.82 phosphorous oxychloride | 1.23 | 0.1160 | 0.39 | 117000 | 87.5 | 4.06 |
| 52 | 10.28 | 0.58 oxathiane | 0.89 | 0.2361 | 0.39 | 59500 | 85.7 | 3.98 |
| 53 | 11.73 | 0.87 isoquinoline | 0.975 | 0.1189 | 0.39 | 50000 | 89.4 | 4.32 |
| 54 | 9.16 | 0.83 2-ethoxyethyl-pivalate | 1.04 | 0.1012 | 0.39 | 46700 | 89.4 | 4.78 |

TABLE 1-continued

| Example No. | MgCl$_2$ g | Electron-donor compound used in 1:1 molar complexes with TiCl$_4$ g | Ti % weight (a) | supported cat. componant(b) g | P-methoxy bezoate/Al molar ratio | yield g polymer/g Ti | Residue in boiling n-heptane % | $\eta$ih dl/g |
|---|---|---|---|---|---|---|---|---|
| 55 | 8.82 | 0.96 diphenylsulphone | 1.15 | 0.1431 | 0.39 | 50000 | 89.3 | 4.27 |

(a) determined by analysis
(b) milled for 16 hours
(c) milled for 48 hours; 1:2 molar complex TiCl$_4$-ethyl-p-methoxybenzoate.

EXAMPLE 56

11.8704 g anhydrous MgCl$_2$ and 0.28 ml TiCl$_4$ are milled for 16 hours as described in Example 1.

0.2043 g of the so obtained mixture, containing 0.99% titanium, are suspended in a solution of 0.82 g Al(C$_2$H$_5$)$_3$ and 0.489 g ethyl-p-methoxy benzoate in 50 ml n-heptane, and the resulting suspension is injected under pressure of argon into a 3 liter autoclave heated to 65° C. and containing 930 g propylene. After 5 hours polymerization, 200 g polymer are isolated corresponding to a yield of 99,000 g/g Ti.

The extraction with boiling n-heptane gives a residue of 84.5%. The inherent viscosity of the crude polymer is 4.14 dl/g.

EXAMPLE 57

4.6515 g anhydrous MgCl$_2$, 4.6734 g B$_2$O$_3$ dried in vacuo at 450° C. and 2.5196 g of the complex TiCl$_4$.C$_6$H$_5$COOC$_2$H$_5$ are milled for 120 hours following the method described in Example 1.

0.0508 g of the so obtained mixture (containing 2.99% by weight titanium) are suspended in a solution previously prepared by reacting for 10 minutes, in 50 ml n-heptane, 0.665 g Al(C$_2$H$_5$)$_3$ and 0.430 g ethyl alpha-naphthoate, and the resulting suspension is injected into a 2 liter autoclave heated to 65° C. and containing 2 liter hydrogen and 500 g propylene.

After 5 hours polymerization, 52 g polymer are obtained corresponding to a yield of 34,500 g polymer/g titanium employed. The extraction with boiling n-heptane gives a residue of 85.3%.

The inherent viscosity of the crude polymer is 1.83 dl/g.

EXAMPLE 58

The Example 57 is repeated employing in this run 0.0499 g of the catalyst obtained by co-milling MgCl$_2$, B$_2$O$_3$ and TiCl$_4$.C$_6$H$_5$COOC$_2$H$_5$ and substituting the ethyl alpha naphthoate by 0.314 g ethyl p-methylbenzoate.

85 g polymer are obtained corresponding to a yield of 57000 g polymer/g titanium employed.

The residue of the extraction with boiling n-heptane is 85%. The inherent viscosity of the crude polymer is 2.75 dl/g.

EXAMPLE 59

4.2770 g anhydrous MgCl$_2$, 4.3553 g B$_2$O$_3$ dried in vacuo at 450° C. and 2.2718 g of the complex TiCl$_4$.C$_6$H$_5$COOC$_2$H$_5$ are milled for 110 hours as described in Example 1.

0.0673 g of the so obtained product (containing 2.72% by weight titanium) are suspended in a solution prepared by reacting for 10 minutes, in 50 ml n-heptane, 0.80 g of the compound (C$_2$H$_5$)$_2$Al—N(C$_4$H$_9$)—Al(C$_2$H$_5$)$_2$ and 0.105 g ethyl p-methoxy benzoate, and the resulting suspension is injected into a 2 liter autoclave heated to 65° C. and containing 1.3 liter hydrogen and 500 g propylene.

After 5 hours polymerization 117 g polymer are obtained corresponding to a yield of 64000 g polymer/g titanium employed. The residue of the extraction with boiling n-heptane is 88%. The inherent viscosity of the crude polymer is 2.62 dl/g.

EXAMPLE 60

11.0652 g anhydrous MgCl$_2$ and 0.826 g of the complex TiCl$_4$.C$_6$H$_5$COOC$_2$H$_5$ are milled for 16 hours as described in Example 1.

0.3168 g of the so obtained product (containing 0.995% by weight titanium) are suspended in a solution prepared by reacting, in 50 ml n-heptane, 0.695 g Al(i-C$_4$H$_9$)$_3$ and 0.1673 g ethyl benzoate, and the resulting suspension is injected into a 3 liter autoclave heated to 65° C. and containing 890 g propylene.

After 5 hours polymerization 250 g polymer are obtained corresponding to a yield of 79,000 g polymer/g titanium employed. The residue of the extraction with boiling n-heptane is 87.5%. The inherent viscosity of the crude polymer is 3.94 dl/g.

EXAMPLE 61

9.1156 g of a mixture of equal parts of anhydrous MgCl$_2$ and B$_2$O$_3$ dried in vacuo at 450° C., previously milled for 120 hours in a ball mill, are co-milled with 2.0345 g of the 1:1 molar complex TiCl$_4$.CH$_3$CH$_2$COOC$_2$H$_5$ in the same conditions described in Example 1, in a nitrogen atmosphere for 110 hours.

0.054 g of the so obtained product (containing 3% by weight titanium) are suspended in a solution previously prepared by reacting for 5 minutes, in 50 ml n-heptane, 0.665 g Al(C$_2$H$_5$)$_3$ and 0.177 g ethyl propionate and the resulting suspension is injected into a 2 liter autoclave heated to 65° C. and containing 2 liter hydrogen and 500 g propylene.

After 5 hours the polymerization is stopped and 23 g polymer are separated corresponding to a yield of 14,200 g polymer/g titanium employed. The extraction with boiling n-heptane gives a residue of 65%. The inherent viscosity of the crude polymer is 1.74 dl/g.

EXAMPLES 62 to 71

In table 2 some examples of propylene polymerization are reported carried out in the same conditions as described in Example 2 substituting the electron-donor compounds listed in the table for the ethyl benzoate.

TABLE 2

| Example No | MgCl2 g | Electron-donor compound used in 1:1 molar complexes with TiCl4 | | Ti % weight (a) | supported cat. component (b) g | Electron-donor compound complexed with AlEt3 | B/Al molar ratio | Yield g polymer/g Ti | Residue in boiling n-heptane % | η in dl/g |
|---|---|---|---|---|---|---|---|---|---|---|
| 62 | 7.5 | 0.65 | ethyl cyclohexanoate | 1.1 | 0.1 | ethyl cyclohexanoate | 0.5 | 139,000 | 75 | |
| 63 | 9.68 | 1.04 | ethyl β naphthoate | 1.26 | 0.1203 | ethyl β naphthoate | 0.35 | 59,300 | 89.7 | 4.27 |
| 64 | 10.49 | 0.70 | ethyl p-methyl-benzoate | 0.88 | 0.1686 | ethyl p-methyl-benzoate | 0.33 | 152,600 | 85.5 | 3.62 |
| 65 | 8.75 | 0.65 | sec-butyl p-methoxy benzoate | 0.89 | 0.0831 | sec-butyl p-methoxybenzoate | 0.80 | 135,300 | 85. | 2.98 |
| 66 | 11.39 | 0.82 | ethyl p-methoxy benzoate | 0.87 | 0.1985 | dibutyl 1.3-dioxolane-4,5-dicarboxylate | 0.40 | 177,000 | 80.1 | 3.97 |
| 67 | 11.54 | 0.83 | ethyl p-n-butoxy-benzoate | 0.805 | 0.1766 | ethyl p-n-butoxy benzoate | 0.40 | 173,300 | 86.2 | 4.14 |
| 68 | 9.30 | 0.66 | ethyl pivalate | 1.02 | 0.0938 | ethyl pivalate | 0.40 | 320,000 | 55 | |
| 69 | 10.08 | 1.23 | ethyl o-methylbenzoate (c) | 1.42 | 0.1753 | ethyl o-methyl benzoate | 0.30 | 83,000 | 87.1 | 3.78 |
| 70 | 8.13 | 1.11 | isobutyl benzoate (c) | 1.14 | 0.1580 | isobutylbenzoate | 0.30 | 97,200 | 85 | 3.76 |
| 71 | 8.38 | 0.74 | ethyl o-chlorobenzoate | 0.95 | 0.1439 | ethyl-o-chlorobenzoate | 0.30 | 60,800 | 89.7 | 3.97 |

(a) Determined by analysis.
(b) Milled for 16 hours.
(c) Molar ratio TiCl4:electron-donor 1:2.

EXAMPLE 72

9.6 g anhydrous MgCl2 and 0.405 g TiCl4 are milled for 16 hours as described in Example 1.

0.1307 g of the thus obtained product are suspended in the solution of 0,665 g Al(C2H5)3 and 0.272 g ethyl-N,N-diethyl-carbamate in 50 cm³ n-heptane. The solution was prepared at room temperature and maintained at this temperature for 10'.

The thus obtained suspension is injected under pressure of dry argon into a stainless steel autoclave having a 2 liter capacity, provided with a stirrer heated to a temperature of 65° C. and containing 500 g propylene.

After 5 hours polymerization 225 g polymer are obtained, which correspond to a yield of 173,000 g/g Ti.

The residue to the extraction with boiling n-heptane was 60%.

EXAMPLE 73

A 1:1 by weight mixture of anhydrous MgCl2, milled for 50 hours in a vibrating mill up to a surface area of 22 m²/g, and B2O3 dried in vacuo at 450° C. was co-milled in a vibrating mill for 24 hours with the complex TiCl4 ethylbenzoate used in an amount corresponding to a Ti metal content in the co-milled product = 3% by weight.

The surface area of the co-milled product was 2.8 m²/g. The X rays spectrum of the co-milled product showed a broadening of the most intense diffraction lines characteristic of the normal non-activated MgCl2.

0.5 g of the thus obtained product was suspended in a solution of 12 g Al(C2H5)3 in 500 cm³ anhydrous n-heptane containing ethyl-p-methoxy benzoate in an amount corresponding to a volume ratio with the Al-triethyl of 0.41 to 1.

The suspension is injected into a stainless steel autoclave having capacity of 30 l provided with a stirrer heated to 65° C. and containing 10 Kg of propylene and 5 l of hydrogen measured at normal conditions.

After 5 hours polymerization the yield in polypropylene amounted to 192,000 g/g Ti. The extraction with boiling n-heptane give a residue of 90%.

EXAMPLE 74

12.9 g of the complex MgCl2.C6H5COOC2H5 are reacted at 40° C. for 20 hours with 103 cc of a 1 molar solution of Al(C2H5)3 in n-heptane. The reaction mixture is filtered and the solid portion is washed with n-heptane and dried under vacuum. 5 grams of the thus obtained solid which is essentially formed of MgCl2 are added under mechanical stirring to a 100 cc toluene solution containing 800 mg of the complex TiCl4.C6H5COOC2H5. This mixture is maintained under agitation for 24 hours at 25° C.; afterwards the mixture is filtered and the insoluble portion washed with n-heptane. The titanium content of the solid is 1.24% by weight.

Into a 3-liter autoclave equipped with magnetic stirrer and thermoregulated at 60° C. where into propylene was made to flow are introduced in this sequence: 950 cc of n-heptane, a 50 cc solution in n-heptane of 1.25 cc of Al (isobutyl)3 and of 1.5 cc of methyl paratoluate. After 5 minutes 103 mg of the above obtained solid complexed product suspended in 20 cc n-heptane are added thereto.

The autoclave is closed and then there are introduced 0.5 atm hydrogen and 5 atm. propylene. The propylene pressure is kept constant during the polymerization. After 4 hours the run is stopped. 30 g of polypropylene are obtained corresponding to a yield of 23,400 g polypropylene/g Ti, which gives a residue to the extraction with boiling n-heptane of 90%. The viscosity [η] is 1.8 dl/g.

We claim:

1. Process for preparing a component of catalysts for the stereoregular polymerization of alpha-olefins of the formula CH2=CHR in which R is an alkyl radical having from 1 to 6 carbon atoms, which process comprises contacting a halogenated bi-, tri-, or tetra-valent Ti compound, or a complex of said Ti compounds and an electron-donor compound, with a support formed of or comprising an anhydrous Mg or Mn dihalide obtained by reacting, with a trialkyl Al compound, a complex of the Mg or Mn dihalide and an electron-donor compound, selected from the group consisting of esters of oxygenated organic or inorganic acids, the Al trialkyl/ester molar ratio being higher than 1.0.

2. The process of claim 1, in which the Al trialkyl is Al triethyl.

3. The process of claim 1, in which the amount of Ti compound contained in the catalyst, expressed as Ti metal, is from 0.1% to 10% by weight.

4. The process of claim 1, in which the component of the catalyst is the product obtained by contacting an addition product of the Ti compound and ethyl benzoate with the support.

5. The process of claim 1, in which the component of the catalyst is obtained by contacting an addition product of the Ti compound and methoxy benzoate with the support.

6. The process of claim 1, in which the component of the catalyst is the product obtained by contacting an addition product of the Ti compound and ethyl-alpha-naphthoate with the support.

7. The process of claim 1, in which the activated Mg or Mn bihalide of the support is the product obtained by reacting a normal, non-activated Mg or Mn bihalide with ethyl benzoate and decomposing the resulting reaction product with an Al trialkyl in an amount such that the Al trialkyl/ester molar ratio is higher than 1.

8. The process of claim 1, in which the activated Mg or Mn bihalide of the support is the product obtained by reacting a normal, non-activated Mg or Mn bihalide with ethyl-p-methoxy benzoate and decomposing the resulting reaction product or complex by treatment thereof with an Al trialkyl in an amount such that the Al trialkyl/ester molar ratio is higher than 1.

9. The process of claim 1, in which the activated Mg or Mn bihalide of the support is the product obtained by reacting a normal, non-activated Mg or Mn bihalide with ethyl-alpha-naphthoate and decomposing the resulting reaction product or complex by treatment thereof with an Al trialkyl in an amount such that the Al trialkyl/ester molar ratio is higher than 1.

* * * * *

UNITED STATES PATENT AND TRADEMARK OFFICE
CERTIFICATE OF CORRECTION

PATENT NO. : 4,187,196

DATED : February 5, 1980

INVENTOR(S) : Umberto GIANNINI et al

It is certified that error appears in the above—identified patent and that said Letters Patent is hereby corrected as shown below:

Col. 2, line 7 from below    "haphthoate" should be

- - - naphthoate - - -;

Col. 3, line 15 from below

"N,N,N',N'-tetramethylethylendiaminol"

should be - - - N,N,N',N'-tetramethylethylenediamine - - -;

Col. 4, line 1    "[N(C$_4$H$_9$)$_4$]2TiCl$_6$"    should be

- - - [N(C$_4$H$_9$)$_4$]$_2$ TiCl$_6$ - - -;

Col. 4, line 16 from below    "with a trialkyl" should be

- - - with an Al-trialkyl - - -;

Col. 4, line 15 from below    "Al trialkyl ester molar"

should be - - - Al-trialkyl/ester molar - - -;

Col. 6, line 24    "65°" should be - - - 65 °C - - -;

Col. 7, line 16    "in Example  270 g polymer" should be

- - - in example 2, 70 g polymer - - -;

UNITED STATES PATENT AND TRADEMARK OFFICE
CERTIFICATE OF CORRECTION

PATENT NO. : 4,187,196
DATED : February 5, 1980
INVENTOR(S) : Umberto GIANNINI et al It is certified that error appears in the above—identified patent and that said Letters Patent is hereby corrected as shown below:

Col. 7, line 19 from below   "in Example 1, using" should be - - - in example 1. Using - - -;

Col. 8, line 12 from below - - - cancel comma (,) after 100 $cm^3$ - - -;

Col. 11, line 18   "ethyl ether" should be - - - n-heptane - - -;

Col. 11, Example No. 51, line 4 from below   "phosphorous" should be - - - phosphorus - - -;

UNITED STATES PATENT AND TRADEMARK OFFICE
CERTIFICATE OF CORRECTION

PATENT NO. : 4,187,196
DATED : February 5, 1980
INVENTOR(S) : Umberto GIANNINI et al It is certified that error appears in the above—identified patent and that said Letters Patent is hereby corrected as shown below:

Col. 15, last line    "give" should be - - - gave - - -.

Signed and Sealed this

Eighteenth Day of May 1982

[SEAL]

Attest:

GERALD J. MOSSINGHOFF

Attesting Officer    Commissioner of Patents and Trademarks